US006002095A

United States Patent [19]

Bodie et al.

[11] Patent Number: 6,002,095

[45] Date of Patent: Dec. 14, 1999

[54] SELECTIVE PRINTING OF POSTNET BARCODE FOR INSERTING SYSTEM

[75] Inventors: Kevin W Bodie, Bethel; Jim Churchill, Newtown; Michael A Gagliardi, Plantsville; Robert K Gottlieb, Milford, all of Conn.

[73] Assignee: Pitney Bowes Inc., Stamford, Conn.

[21] Appl. No.: 08/646,186

[22] Filed: May 7, 1996

[51] Int. Cl.[6] .............................. B07C 5/00; G06F 17/00

[52] U.S. Cl. .......................... 209/584; 209/900; 235/375

[58] Field of Search .................................... 209/559, 562, 209/563, 564, 583, 584, 900; 235/375, 432; 101/92, 93.18, 93.21, 103

[56] References Cited

U.S. PATENT DOCUMENTS 4,853,865 8/1989 Sansone et al. .................... 235/375 X
5,283,752 2/1994 Gombault et al. .................. 235/375 X
5,387,783 2/1995 Mihm et al. ........................... 235/375
5,460,086 10/1995 Bernardo et al. .................... 101/93.18

FOREIGN PATENT DOCUMENTS 4201728 7/1993 Germany .............................. 209/584
6071228 3/1994 Japan .................................... 209/584

*Primary Examiner*—Tuan N. Nguyen
*Attorney, Agent, or Firm*—Christopher J. Capelli; Melvin J. Scolnick; Robert Meyer

[57] ABSTRACT

A method of selectively printing a Postnet barcode on an envelope which includes conveying an address bearing document from an input module along a chassis from an upstream location to a downstream location. Also including scanning the document at the input module to determine whether or not a Postnet barcode is to be printed on the envelope and printing a Postnet barcode with a printer on the envelope if the scanning process indicates that the document contains data which is valid based on a selected configuration. Further including, changing the font of the printer to print a blank string, if the scanning process indicates that the document contains data which is not valid based on selected configuration.

5 Claims, 3 Drawing Sheets

SELECTIVE PRINTING OF POSTNET BARCODE FOR INSERTING SYSTEM

BACKGROUND OF THE INVENTION

The instant invention relates generally to inserting machines and more particularly to a method for selectively printing a Postnet barcode on envelopes.

It has long been an objective of the U.S. Postal Service to have all of the U.S. mail pre-barcoded. The barcode employed by the U.S.P.S. mail processing equipment is known as Postnet, and is comprised of a series of short and long bars which encode a ZIP+4 for a given address. This barcode sequence can be presently seen on certain types of mail pieces today, particularly business reply and courtesy reply (payment) envelopes.

The barcode reading and sorting technology is present in all major mail processing facilities nationwide. Mail which is not pre-barcoded is first sent through a complex optical character reading machine (OCR) which captures an image of the typed or hand written address, converts this image to text, looks up the address in a 4 billion character national ZIP+4 street data base, and "sprays" the barcode equivalent of the ZIP+4 on the envelope.

After the OCR stage, the mail is sorted by significantly less expensive barcode sorter (BCS) equipment. The goal to pre-barcode all of the U.S. mail volume is essentially an effort to reduce the expensive and relatively slow OCR step. The U.S.P.S. estimates that a savings of 60 to 80 million dollars per year will be achieved for each one percent of the mail volume which is pre-barcoded. The savings are so dramatic that the U.S.P.S. offers a user discount of approximately 20% for each First Class pre-barcoded mail piece.

Mail pieces sorted into mailings according to the zip code first three digits, last two digits, down to ZIP+4 digits and the mail carrier route level result in progressively lower rates. However, a minimum number of pieces must be present in each grouping to qualify for the lower postal rates.

There is presently available sophisticated equipment for the printing of barcodes on envelopes. One example is an envelope inserting system in which a variety of documents and inserts are assembled, collated and inserted into a waiting envelope. In one such inserting system, the top document in the collation includes the address of the recipient of the envelope, which includes a glass window. The inserting system includes sensors and reading devices which read the address on the document and then the system printer prints a Postnet barcode on the lower portion of the envelope so that the envelope can qualify for a bulk mail presort discount. In order for a mailpiece to qualify for the discount, it generally must include a 9 or 11 digit zip code. However, in certain cases an address does not include such a zip code. The mail pieces that do not contain adequate zip code information cannot be imprinted with a Postnet barcode. However, if nothing is printed on these mailpieces, the output of the inserting system will lack integrity because the output will include mail pieces which are not accounted for by the printer because the printer did not print and thus did not record anything for these mail pieces. Thus, the output of such an inserting system will not have full mail piece integrity.

If the Postnet barcode included a symbol representative of a blank, the output of the inserting system would have integrity and be qualified for a postal discount. But, the Postnet barcode is not capable of printing blanks or anything representing blanks. The instant invention thus provides a method of printing nothing on the envelopes in those cases where the address does not contain the proper zip code information but the printer accounts for such envelopes so that they can be outsorted downstream of the printer and the remainder of the printer output can be accumulated in a bundle which will have integrity and qualify for a postal discount.

SUMMARY OF THE INVENTION

A method of selectively printing a Postnet barcode on a stuffed envelope, comprising: conveying an address bearing document from an input module along a chassis from an upstream location to a downstream location; scanning said document at said input module to determine whether or not a Postnet barcode is to be printed on said stuffed envelope; and printing a Postnet barcode with a printer on said envelope if the scanning process indicates that the document contains data which is valid based on a selected configuration and changing the font of said printer to print a blank string if the scanning process indicates that the document contains data which is not valid based on a selected configuration.

DETAILED DESCRIPTION OF THE PREFERRED EMBODIMENT

Figure 1:
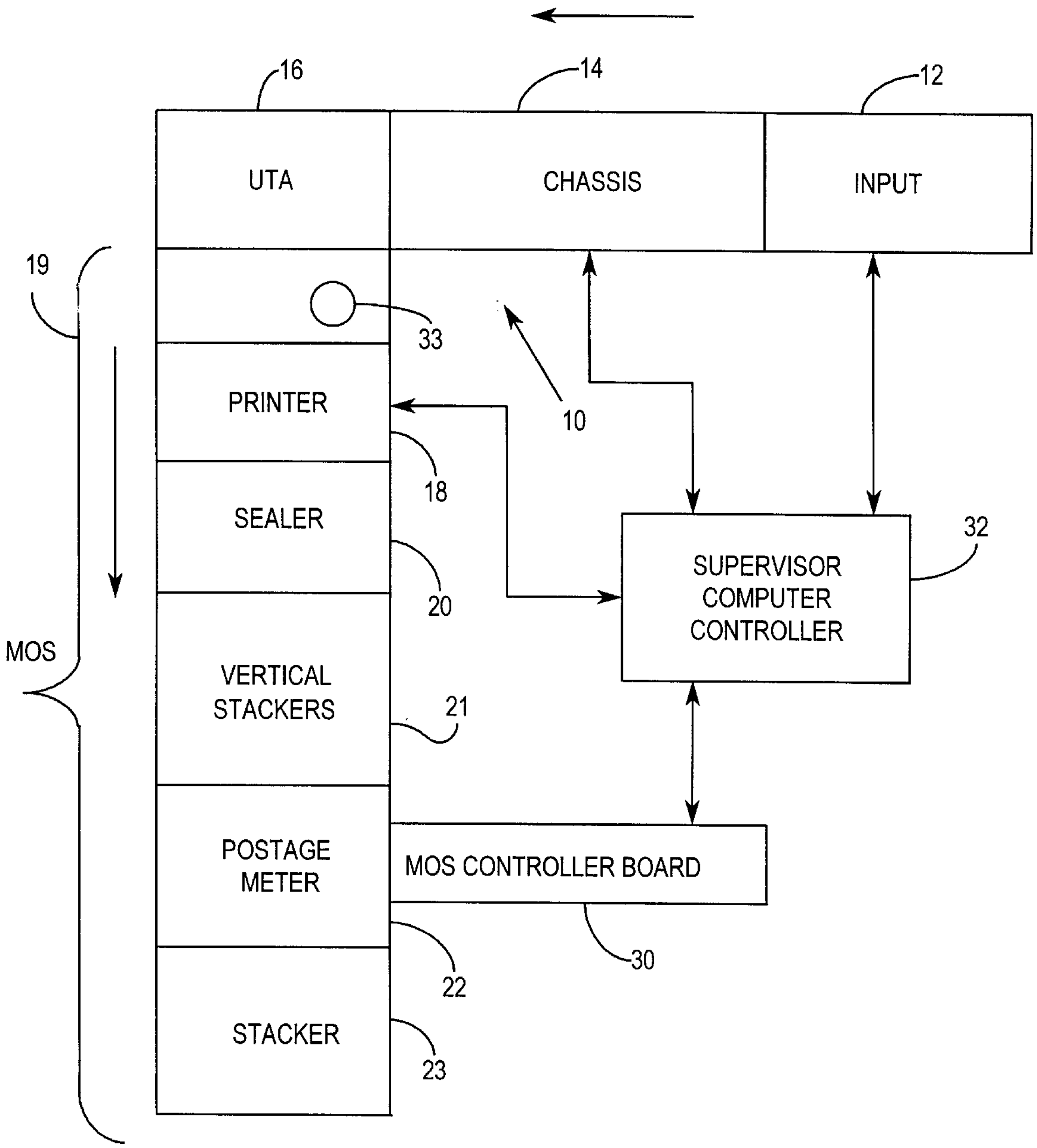
FIG. 1 is a schematic, top plan view of an envelope inserting system in accordance with the instant invention.

In describing the preferred embodiment of the instant invention, reference is made to FIG. 1, wherein there is seen a layout for an inserting system generally designated 10 having an input module 12 which typically feeds discrete sections of web after the web has been burst or cut. The web sections are then transported downstream toward a chassis 14 which includes feeders and their associated hoppers for feeding additional documents and inserts to the downstream end of the chassis 14 which includes an envelope inserting station at which the web sections, documents and other inserts are inserted as a collation into a waiting envelope. The now stuffed envelope exits the chassis 14 and is conveyed to a universal take-away (UTA) module 16 which changes the direction of travel but not the orientation of the stuffed envelope and feeds the stuffed envelope to the mail output system (MOS) 19, which includes a printer 18. The functioning of the printer 18 will be explained in further detail hereinbelow. After the printer 18 has printed the necessary information on the stuffed envelope, the envelope is conveyed to a sealer 20 (also part of the MOS 19) which moistens the flap of the envelope and closes the flap against the body of the envelope. The sealed envelope is then conveyed from the sealer 20 to a postage meter 22 and then to a stacker 23. If the sealed envelope is printed with a blank string in accordance with the instant invention, as described in further detail hereinbelow, the envelope is outsorted by vertical stackers 21.

The control loop (see FIG. 3) for the in-line address processing of the stuffed envelope will now be described. Logic step 101 is the Start of the control loop for in-line address processing. This process takes place in the MOS 19. The printer 18 prints an address and/or Postnet barcode and the MOS 19 may seal, outsort, or apply postage to the stuffed envelope.

The data used to print the zip code is obtained when the mail piece is scanned in the input module 12. The data may be present in the barcode string that is scanned when the insertion collation is assembled or it may be present in a Mail Run Data File (MRDF), which is used to hold the contents of what would be contained in the barcode. In either case, the data will be passed from the MOS controller board 30 in the MOS 19 to the supervisor computer controller 32 and from the supervisor computer controller 32 to the printer 18. The MOS controller board 30 runs the MOS 19, which includes the printer 18, the sealer 20, and the stacker 23, and can include motors and meters.

In logic step 102, once a trigger photocell 33 in the MOS 19 is blocked, the controller board 30 tests to see if in-line addressing by the printer 18 is enabled. If the printer 18 is not enabled, processing for this mail piece is finished and the printer control loop is exited, as indicated in logic step 103. If the printer 18 is enabled, processing for this mailpiece continues. The logic step 103 of ending printing allows the user to run jobs that do not use the printer 18.

As indicated in logic step 104, the data is sent from the controller board 30 to the in-line address printer 18. The data to be printed is present in a collation record which is assembled from the scanning of the discrete sections of web. The record is initialized once the discrete section of web is conveyed from the input module 12 onto the chassis 14. As the discrete web section travels through the chassis 14 and onto the MOS 19, the scanned features are processed. The scanned data tells the supervisor computer controller 32 which of the select feeders to use with the discrete web section, which postage meter to use, whether or not to seal the envelope, etc. Also included as part of this data is the zip code or the piece ID from the MRDF. In the case of Postnet barcode printing only, the zip code is generally part of the barcode string.

The collation record is passed from the MOS controller board 30 to the computer controller 32, which tracks collations through the MOS 19, to the printer 18, which uses the collation record to obtain the data to print the envelopes.

Figure 2:
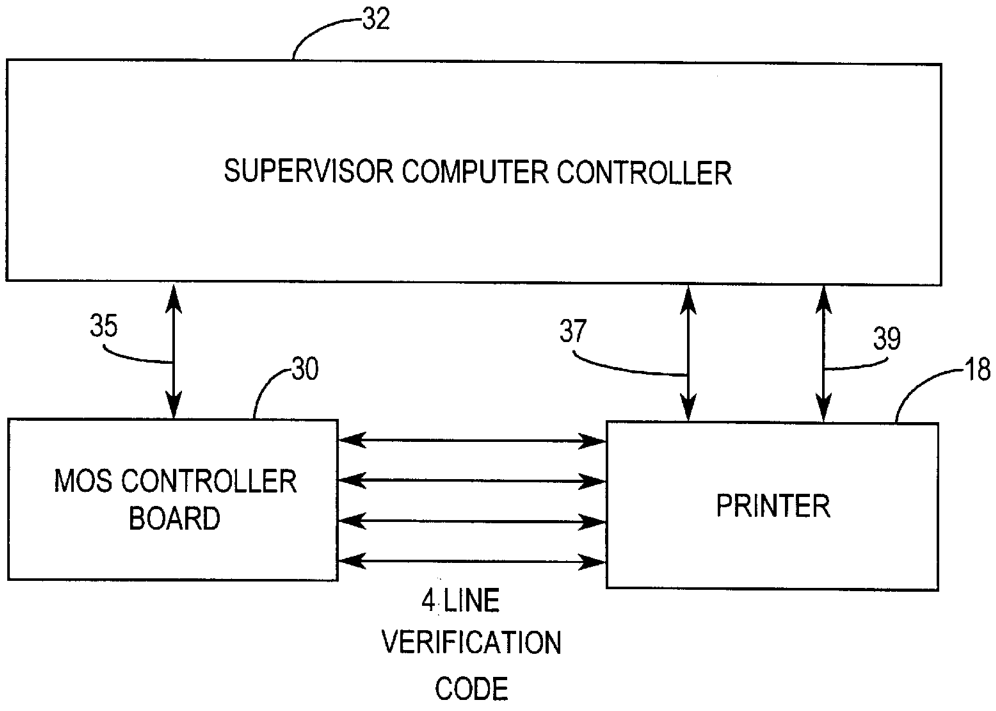
FIG. 2 is a block diagram for the inserter system controller, MOS controller board and printer seen in FIG. 1.

FIG. 2 illustrates that data is sent from the controller board 30 to the computer controller 32 and then to the printer 18. This information transfer is handled by three serial communication links 35, 37 and 39 linking both the controller board 30 and the printer 18 to the corresponding logic stations which are part of the software architecture of the computer controller 32.

Logic step 105 determines whether the data is valid based on configuration options. Once the printer 18 has the data to print an envelope, the printer 18 determines if the data to print is valid based on configuration information which is part of a job set-up. As an example, when the Postnet barcode is used, it may be printed always or never for 9 digit zip codes and larger, or for 11 digit zip codes only. The data is compared with the configuration options selected.

The control block 106 is used when the data to be printed is not valid based on a selected configuration. The font is changed from the Postnet barcode font to an ASCII, or other font that has blank characters. The actual font used is not important since the only characters used are the blank characters. The printer 18 is sent a blank string which will be printed. Since the only characters sent to the printer 18 are blank, the end result to a user is that nothing is printed, and the envelope has the appearance of envelope B in FIG. 4.

Control block 107 is used when the data to print is valid based on a selected configuration. The actual data corresponding to the mail piece is sent to the printer 18 which prints the Postnet barcode on the envelope, as seen on envelope A in FIG. 4.

Control block 108 shows that the printer 18 prints and outputs a 4 bit verification code. Specifically, once the printer 18 prints an address and/or barcode, a 4 bit verification code which is part of the data is sent as output to the MOS board controller 30. This verification code is 0–15 and is used in a round robin fashion to determine that data sent for a particular piece is the data printed for that piece. The numbers 0–15 are sufficient since less than 16 pieces are sent to the printer 18 before they are printed and the verification codes are output. FIG. 2 shows how the 4 bit verification code is transmitted from the printer 18 by way of four wires of the MOS board controller 30 in the MOS 19.

At logic step 109, the MOS board controller 30 determines if the verification code received from the printer 18 is the verification code that was sent with the mailpiece. If the codes match, the mailpiece was printed correctly. If the codes do not match, the data printed on the mailpiece is not correct. The control block 110 is executed when the verification code received from the printer 18 does not match the code the MOS board controller 30 is expecting. A mismatch error is declared and the mailpiece is out-sorted before any postage is applied the envelope.

Figure 3:
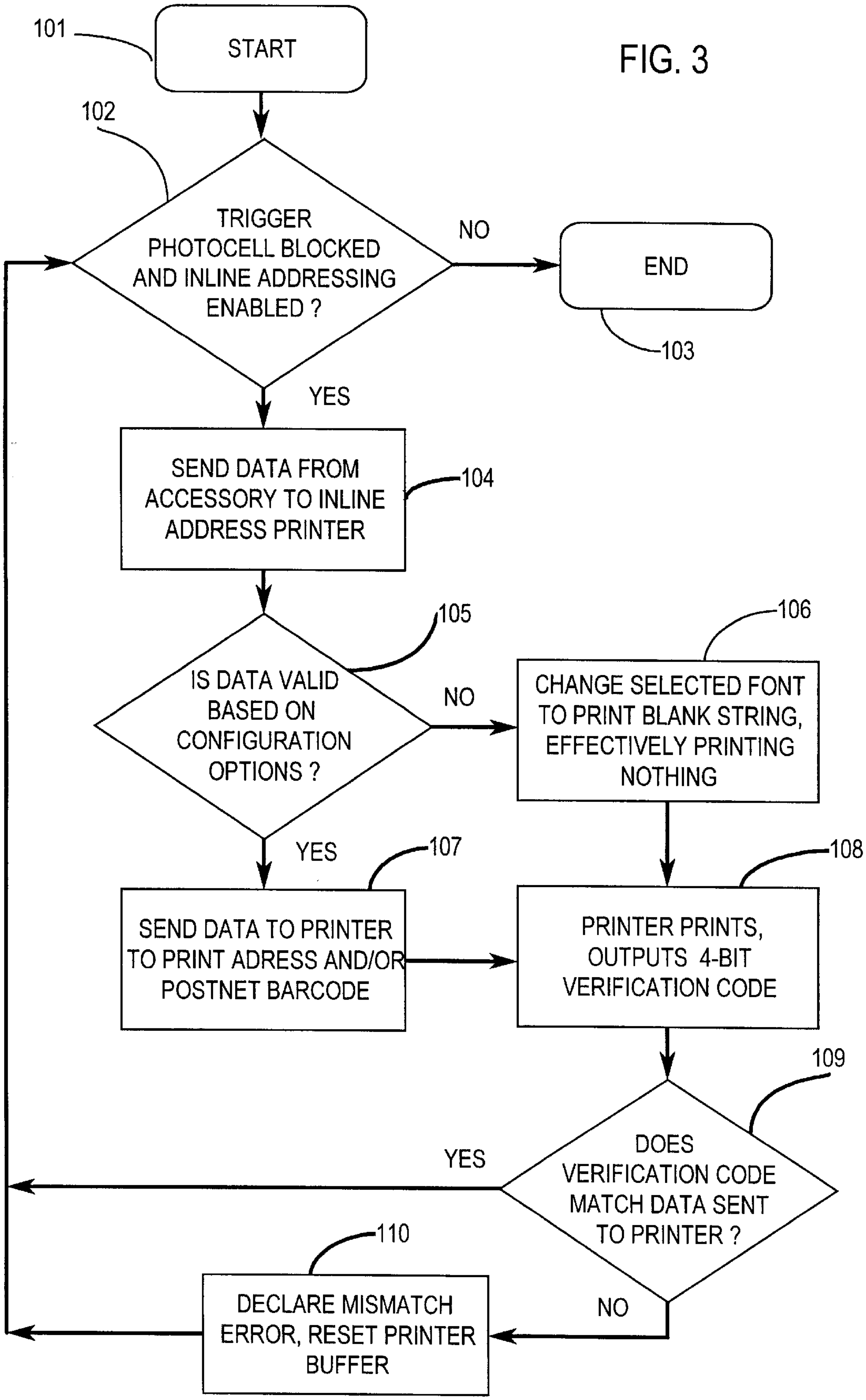
FIG. 3 is a flow chart for the control loop for in-line address processing for the inserting system seen in FIG. 1.

Examples of how the logic step 105 in the flow chart seen in FIG. 3 functions will now be provided. For data in the barcode string in which the system is configured to print Postnet barcode for only 11 digit zipcodes, the following table illustrates which zipcodes would and would not be printed:

| Zipcode | Zip + 4 | Zip + 2 | Printed |
|---|---|---|---|
| 06801 | 0000 | 00 | no |
| 06801 | 1258 | 00 | no |
| 06801 | 1258 | 12 | yes |

For the data in the barcode string in which the system is configured to print zipcodes having 9 or more digits:

| Zipcode | Zip + 4 | Zip + 2 | Printed |
|---|---|---|---|
| 06801 | 0000 | 00 | no |
| 06801 | 1258 | 00 | yes |
| 06801 | 1258 | 12 | yes |

For date in the barcode string in which the system is configured to print zipcodes having five or more digits:

| Zipcode | Zip + 4 | Zip + 2 | Printed |
|---|---|---|---|
| 06801 | 0000 | 00 | yes |
| 06801 | 1258 | 00 | yes |
| 06801 | 1258 | 12 | yes |

If the data resides in the MRDF, the same comparisons as seen in the examples above will be performed, but the field will be tested for blank characters as a missing field in the MRDF is filled with blank characters.

Figure 4:
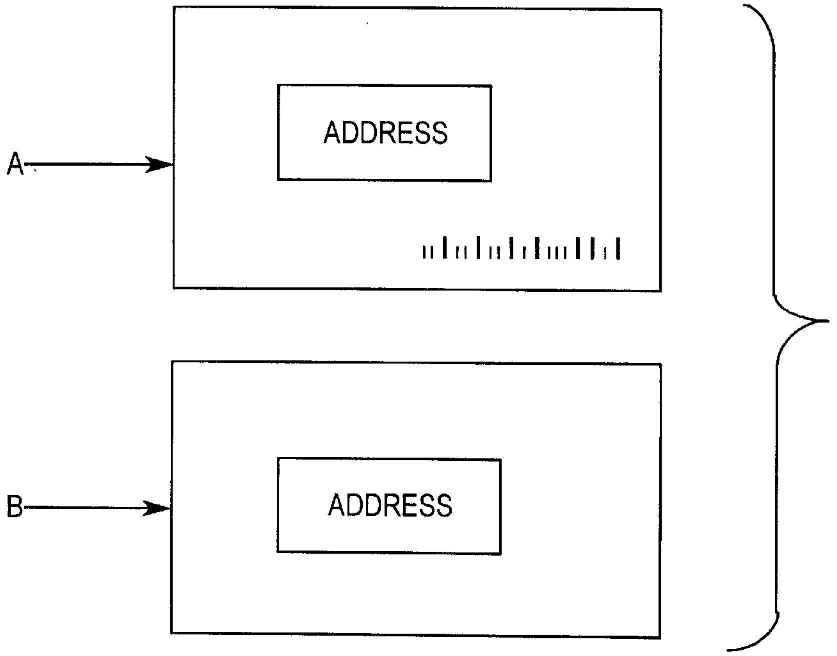
FIG. 4 is a schematic representation of two envelopes printed in accordance with the instant invention.

Referring now to FIG. 4, the envelope A has a Postnet barcode printed in the lower right corner, while envelope B has a blank string printed in the lower right corner. The end result is that nothing visible is printed on envelope B, making it appear to be non-printed. However, the printer was set and an American Standard Code for Information Interchange (ASCII) blank string was printed. Other fonts than ASCII can be used so long as they have characters representative of a blank. In this manner, the output of the inserting system 10 will have full mail piece integrity and qualify for bulk mail presort discount.

It should be understood by those skilled in the art that various modifications may be made in the present invention without departing from the spirit and scope thereof, as described in the specification and defined in the appended claims.

What is claimed is:

1. A method of selectively printing a Postnet barcode on an envelope, comprising the steps of:

conveying an address bearing printed document from an input module along a chassis from an upstream location to a downstream location;

scanning said printed document at said input module to determine whether or not a Postnet barcode is to be printed on said envelope;

inserting said printed document into said envelope; and printing a Postnet barcode on said envelope with a printer downstream of said input module if the scanning process indicates that the printed document inserted in said envelope contains data which is valid based on a selected configuration and changing the font of said printer to print a blank string if the scanning process indicates that the printed document contains data which is not valid based on a selected configuration.

2. The method of claim 1 wherein the blank string is printed in American Standard Code for Information Interchange (ASCII) font.

3. The method of claim 1 wherein the selected configuration requires a 9 digit zipcode.

4. The method of claim 1 wherein the selected configuration requires an 11 digit zipcode.

5. The method of claim 1 comprising the step of outsorting all envelopes printed with a blank string.

* * * * *